May 17, 1960 H. E. F. C. LINGENBRINK 2,937,027

PHONOGRAPH APPARATUS

Filed Jan. 14, 1958 2 Sheets-Sheet 1

INVENTOR.
HERMANN E.F.C. LINGENBRINK
BY
AGENT

May 17, 1960 H. E. F. C. LINGENBRINK 2,937,027

PHONOGRAPH APPARATUS

Filed Jan. 14, 1958 2 Sheets-Sheet 2

INVENTOR.
HERMANN E.F.C. LINGENBRINK
BY
Carl H. [signature]
AGENT

United States Patent Office 2,937,027

Patented May 17, 1960

2,937,027
PHONOGRAPH APPARATUS

Hermann E. F. C. Lingenbrink, Hilltown, Pa., assignor to Philco Corporation, Philadelphia, Pa., a corporation of Pennsylvania Application January 14, 1958, Serial No. 708,812

2 Claims. (Cl. 274—23)

This invention relates generally to electro-acoustic transducing equipment, and more particularly to improved positioning apparatus for use with a phonograph tone arm permitting controlled movement of the phonograph stylus into and out of engagement with the phonograph record.

Fundamental to the optimum performance of any record-type phonograph system is the quality of the record being played. Investigation has shown a significant loss of quality results from improper placement and removal of the tone arm stylus during record play, a condition which is of increasing import with the advent of microgroove recording since this technique permits the transcription of a plurality of selections on one side of a record, and often makes it necessary to resort to frequent manual placement of the tone arm stylus in order to play the desired selection.

This problem, moreover, is present in all but the more expensive phonograph systems such as those employing some type of tone arm damping, as for example the well known viscous heel damping, which tends to prevent high speed movement of the stylus under most conditions of operation. This latter technique, while effective, has the principal disadvantage of being unavailable to the majority of users because of cost.

It is accordingly an object of this invention to provide indexing means which facilitate the manual manipulation and handling of the phonograph tone arm, and which permit controlled movement of the tone arm stylus into and out of record engagement.

It is another and subordinate object of this invention to provide means for positioning the pickup stylus in accurate registration with the lead-in groove of a disk type phonograph record.

It is still another object of this invention to provide means permitting placement of the phonograph needle, at any desired location on the record, through a leverage system insuring low-velocity descent of the stylus toward the record to thereby eliminate record damage induced by high energy impact between record and stylus.

Still another object of this invention is to provide a tone arm positioning device which is of simple construction, inexpensive, and readily adapted to tone arms of conventional design.

The above mentioned and other objects within contemplation will be more readily understood by reference to the accompanying detailed description and drawing, in which.

Briefly described, this invention relates generally to improved means for positioning a tone arm, and basically comprises a lever pivotally mounted upon the tone arm and adapted to perform a three fold function, namely; to facilitate handling and manipulation of the tone arm, to provide means for positioning the tone arm stylus in predetermined registration with the initial groove of a phonograph record and, to provide a leverage system permitting controlled movement of the stylus into and out of playing engagement with the phonograph record.

Figures 1, 2, 3, 4, 5:
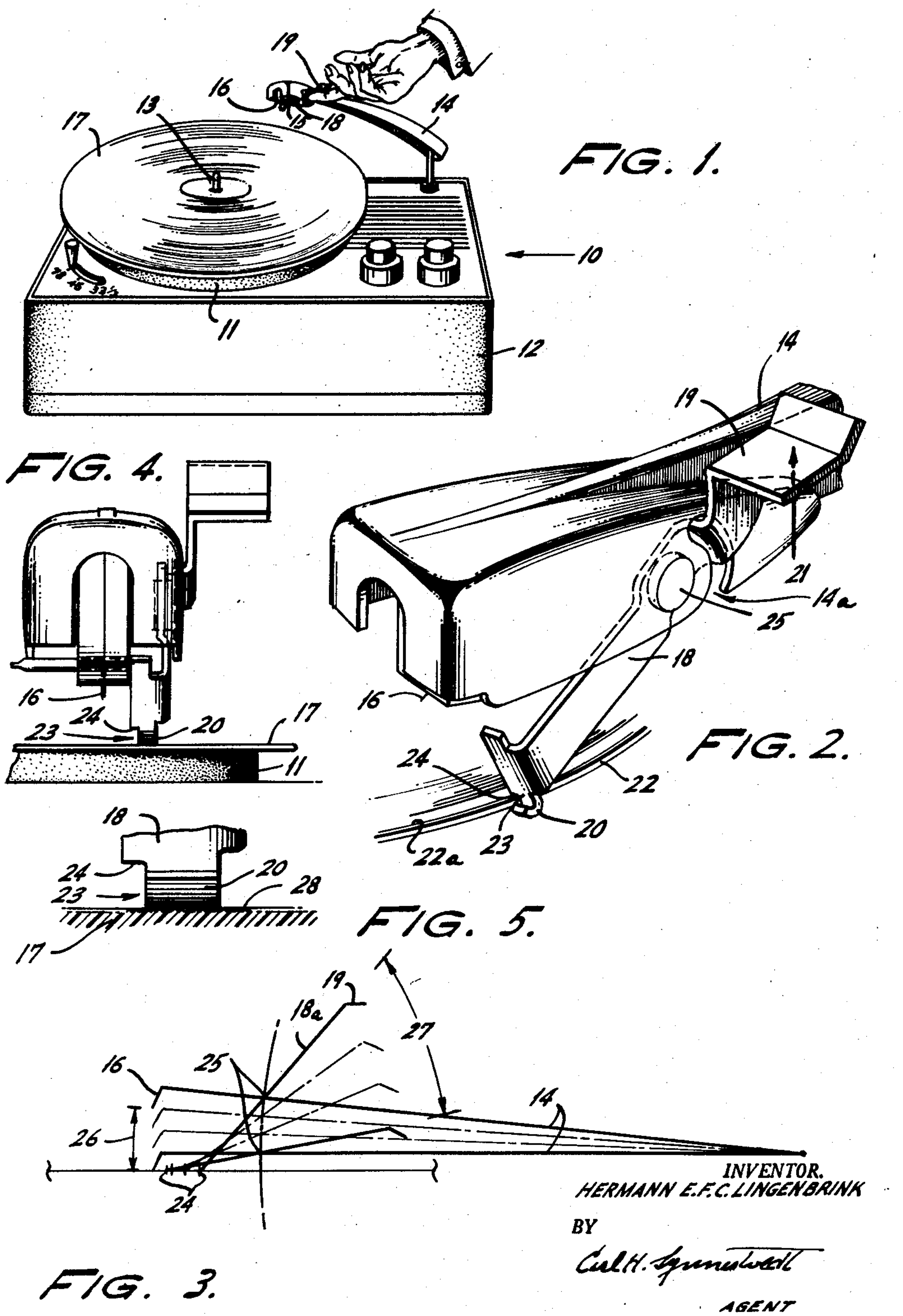
Figure 1 is a perspective showing of phonograph apparatus embodying the present invention.
Figure 2 is an enlarged fragmentary perspective view of a tone arm showing positioning means of preferred design.
Figure 3 is a graphic representation showing the sequence of movements during stylus placement.
Figure 4 is a front elevational view showing the tone arm positioning means preparatory to stylus placement on an inwardly disposed surface of the phonograph record.
Figure 5 is an enlarged view of the lever record contact area seen in Figure 4.

Now making more detailed reference to the drawing, Figure 1 illustrates a conventional phonograph 10 including a turntable 11 rotatably journalled within the housing 12, the phonograph being adapted for vari-speed recording through conventional drive means, not shown. A centering spindle 13 serves to orient the records and to retain them on the turntable 11. The tone arm 14 which includes a pick-up 15 provided with a stylus 16 adapted for excitation by the modulated grooves of a phonograph record, is arranged on the mounting panel to swing horizontally and to pivot vertically with respect to the turntable 11 in a manner permitting the stylus 16 to be brought into playing engagement with the phonograph record 17 positioned on turntable 11.

Mounted upon the tone arm housing 14 for pivoting movement relative thereto is the positioning device or lever 18, the preferred embodiment being shown most clearly in Figure 2. The lever is conveniently provided with a finger grip 19, which as shown in Figure 1, may be used to position the tone arm in desired location on the phonograph record 17, the arm being counterbalanced to retract into the tone arm housing when released for normal play. Lifting the tone arm by means of the finger grip 19 automatically results in extension of the forward record contacting portion 20 of lever 18 beyond the tip of stylus 16. The lever portion when extended into abutment with the record prevents contact between the record and stylus during the initial stage of tone arm placement, the lever providing a leverage system, described in detail below, which permits controlled, gradual movement of the tone arm stylus 16 into playing engagement with the phonograph record.

Figure 2 shows the lever 18 in its fully extended, indexing position, its maximum extension being delimited by the arcuate groove 14*a* provided in the tone arm housing, the lever being actuated by a force graphically represented by vector 21. The lever 18 is so arranged that when brought into abutment with the edge of the record 22, as shown in Figure 2, the stylus 16 is aligned with the record lead-in groove 22*a*. The contact sensing portion of the lever is provided with a notch or detent 23 adapted to receive the record edge 22 and to provide a fulcrum for movement of lever 18, the surface 24, formed by the notch, making sliding contact with the record surface during stylus placement. On proper radial location of the tone arm, the stylus is deposited onto the phonograph record by simply lowering the finger grip 21. The lever 18, acting through the fulcrum 24, results in movement of the stylus into record engagement at a speed substantially less than that of finger grip movement, converting the critical operation of stylus placement into one which admits of lowering movement of the finger—which movement was heretofore solely determinative of the speed of stylus descent— at speeds greater than heretofore permissible. This simplified procedure, which permits controlled movement of the stylus into playing engagement with the record, reduces impact between record and stylus, eliminating record damage resulting from stylus placement.

The speed reduction effected by this leverage system can best be understood by reference to Figure 3 which graphically depicts, by means of line representations numbered in accordance with the members represented, the sequence of movements during stylus placement.

Tone arm movement is traced from the instant of lever contact through that of stylus placement on the phonograph record. The lever when utilized to lift the tone arm pivots about boss 25 (seen in Figure 2) and initially assumes the fully extended position shown by line 18*a*, this line depicting the lever at the instant it makes contact with the phonograph record. This arrangement provides a second class leverage system, the lever 18 acting through the sliding support or fulcrum 24. As shown, the path of motion 26 described by stylus 16 on being lowered into contact with the record, is substantially less than the path of motion 27 through which the operator's hand or other source of power moves, resulting in diminution of the stylus approach velocity and reducing the force of impact and consequent damage to the record. This system, as will be obvious, also provides a unique method of lifting the stylus out of record engagement preparatory to its repositioning by simply reversing the action described in Figure 3.

This invention not only permits accurate indexing of the tone arm stylus relative to the record edge but additionally facilitates the gentle placement of the stylus at any point on the surface of the record, reducing record damage and materially lengthening the useful life of the phonograph record.

Figure 4 shows the stylus suspended at a position inwardly of the record edge, the forward portion 20 of the lever 18 riding on the record surface. To prevent damage to the record, the contacting surface of the lever tip 20 is of a configuration permitting it to ride smoothly on the land areas 28 between grooves, as shown in enlarged section in Figure 5, and of a width insuring adequate distribution of the tone arm weight to prevent any damaging concentration of pressure. Movement of the stylus into playing engagement with the record is substantially the same as that shown in Figure 3 and described above.

Figure 6:
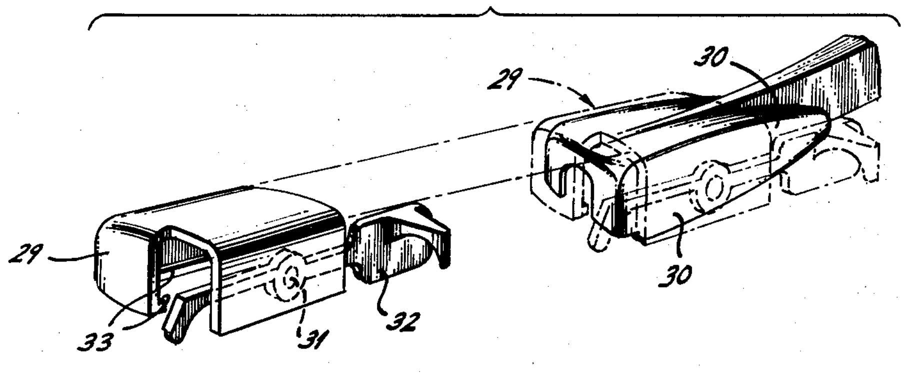
Figure 6 illustrates a detachable stylus positioning device and shows the mode of installation on a conventional tone arm.
Figure 8:
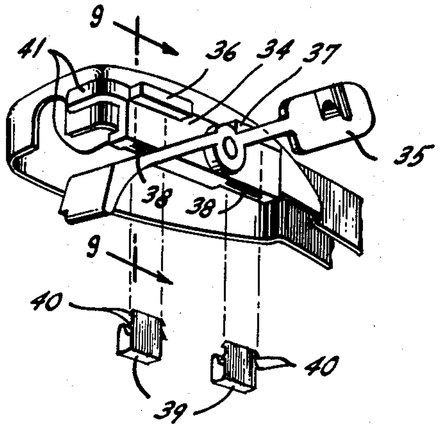
Figure 8 shows still another detachable stylus positioning assembly mounted on a conventional tone arm.
Figure 9:
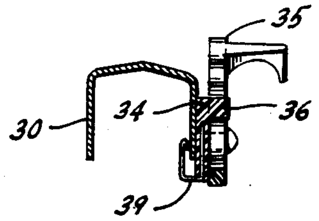
Figure 9 is a sectional view taken along the cutting plane 9—9 of Figure 8.

To facilitate attachment of this unique leverage system to tone arms presently in use, the embodiments shown in Figures 6 and 8 are provided, the device having advantageous application to both automatic and manually operable phonograph systems. These particular embodiments, coming within the broader contemplation of the present invention, constitute the subject matter of copending application Serial No. 709,506, filed February 17, 1958, and assigned to the assignee of the present invention; now abandoned, the details of construction being fully described therein.

In order not adversely to affect needle pressure, and in order to provide an assembly capable of withstanding continuous handling, the attachments are preferably made from rugged, light weight material such as polystyrene, polyethylene or Teflon, the total weight of either of the embodiments shown being approximately one gram.

Figure 7:
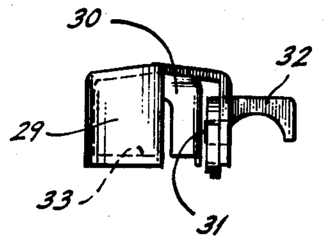
Figure 7 is a front elevation of a tone arm mounting apparatus of the type shown in Figure 6.

Both of the illustrated embodiments require no modification of the supporting tone arm. The design shown in Figure 6 is adapted to be slipped over the nose of the tone arm in the manner indicated, the housing 29 being sufficiently resilient to compensate for minor surface irregularities of the tone arm head 30 and configured to frictionally fit the tone arm head for locking engagement therewith. The boss 31, shown most clearly in Figure 7, pivotally supports the lever 32, shown in its normally recessed position, the boss being sufficiently close to the tone arm housing when installed to prevent the lever from riding off the pivot 31. The inwardly extending marginal flange portions 33 serve to orient the assembly in proper alignment with the supporting tone arm.

The embodiment shown in Figure 8 is adapted to clip on a side wall portion of the tone arm. The structure shown comprises a body portion 34 adapted to pivotally support the lever 35 and is provided with stop members 36 and 37 delimiting lever travel. The body of this structure is additionally provided with recesses 38 configured to receive conventional spring clips 39. The clips are provided with integrally formed barbs 40, which when inserted within the recess 38 imbed themselves in wall portions of the recess becoming fixedly anchored thereto. The entire unit as thus assembled is then snapped onto the side wall of the tone arm as indicated, the assembly being positioned in alignment with the tone arm by means of the locating bosses 41.

Briefly reviewed, this invention relates to a tone arm positioning device comprising a novel leverage system adapted to provide controlled movement of the tone arm stylus into and out of engagement with the phonograph record, the arrangement additionally providing for both radial indexing of the tone arm, and facilitating its manual manipulation.

While preferred embodiments of the invention have been depicted and described, modifications may be made therein without departing from the spirit and scope of the present invention. It will be understood therefore, that such changes and modifications are contemplated as come within the scope of the appended claims.

I claim:

1. In sound reproducing equipment, a stylus-carrying arm mounted for vertical swinging movement into and out of engagement with a phonograph record, a manually operable lever member pivotally mounted to said arm for swinging movement of an end portion thereof into and out of engagement with a record to be played, the record-contacting end portion of said lever being provided with a detent to receive a record edge portion to radially position said stylus relative to the record grooves, said detent having a laterally presented surface forming a fulcrum about which said lever moves to permit low velocity descent of said stylus into engagement with the record, the arrangement being such that the record contacting portions of said lever are moved upwardly to a position free of the record as the stylus is moved into record contact.

2. In sound reproducing equipment, a stylus-carrying arm mounted for vertical swinging movement into and out of engagement with a phonograph record, and a manually operable lever pivotally mounted intermediate its ends on said arm for movement relative thereto between a normally retracted position in which the stylus is free to contact the record, and an extended position abutting the record in which the stylus is held out of record contact, the record contacting end of said lever being configured to receive the outer vertical edge of the record to be played to radially index said arm relative to said record, and having a laterally presented surface forming a fulcrum about which said lever moves permitting low velocity placement of said stylus onto said record, the construction and arrangement being such that the record contacting end of said lever is moved upwardly to a position free of the record as the stylus is moved into record contact.

References Cited in the file of this patent

UNITED STATES PATENTS

| | | |
|---|---|---|
| 2,582,948 | Cairnes | Jan. 22, 1952 |
| 2,586,422 | Fisher | Feb. 19, 1952 |

FOREIGN PATENTS

| | | |
|---|---|---|
| 425,283 | Great Britain | Mar. 11, 1935 |
| 698,663 | Germany | Nov. 14, 1940 |